US007667702B2

(12) United States Patent
Vion-Dury

(10) Patent No.: US 7,667,702 B2
(45) Date of Patent: Feb. 23, 2010

(54) NORMALIZATION OF VECTOR-BASED GRAPHICAL REPRESENTATIONS

(75) Inventor: Jean-Yves Vion-Dury, Saint-Ismier (FR)

(73) Assignee: Xerox Corporation, Norwalk, CT (US)

( * ) Notice: Subject to any disclaimer, the term of this patent is extended or adjusted under 35 U.S.C. 154(b) by 505 days.

(21) Appl. No.: 11/312,267

(22) Filed: Dec. 20, 2005

(65) Prior Publication Data
US 2007/0139429 A1 Jun. 21, 2007

(51) Int. Cl.
G06T 11/20 (2006.01)
(52) U.S. Cl. ..................................... 345/441
(58) Field of Classification Search ............... 345/581, 345/441
See application file for complete search history.

(56) References Cited

U.S. PATENT DOCUMENTS

| | | | |
|---|---|---|---|
| 5,452,238 A * | 9/1995 | Kramer et al. ............... 703/1 |
| 5,771,045 A * | 6/1998 | Ghavam et al. ............. 345/423 |
| 7,158,569 B1 * | 1/2007 | Penner ...................... 375/240 |
| 7,246,143 B2 * | 7/2007 | Hu et al. .................... 708/404 |
| 7,319,945 B1 * | 1/2008 | Shapiro et al. ............... 703/11 |
| 7,466,797 B2 * | 12/2008 | Luan et al. .................... 378/65 |
| 2002/0178183 A1 * | 11/2002 | Meding ...................... 707/509 |
| 2004/0008223 A1 * | 1/2004 | Britton et al. ............... 345/762 |
| 2006/0218140 A1 * | 9/2006 | Whitney et al. ................ 707/5 |
| 2007/0011071 A1 * | 1/2007 | Cuscovitch et al. ........... 705/35 |
| 2007/0139429 A1 * | 6/2007 | Vion-Dury ................... 345/581 |
| 2007/0294649 A1 * | 12/2007 | Pandey et al. .................. 716/4 |
| 2008/0063141 A1 * | 3/2008 | Luan et al. .................... 378/65 |

OTHER PUBLICATIONS

Polygon decomposition based on the straight line skeleton Mirela Tanase, Remco C. Veltkamp SCG '03: Proceedings of the nineteenth annual symposium on Computational geometry, Jun. 2003 ACM.*
"The Monadic Second-Order Logic of Graphs XVI: Canonical Graph Decompositions", Bruno Courcelle LaBRI, Bordeaux 1 University, 33405 Talence, France, hereinafter Courcelle.*
Drawing planar graphs using the canonical ordering, Goos Kant Dept. Of computer science, Utrecht University, Oct. 1992.*
Arend Rensink; Canonical Graph Shapes, Department of Computer Science, University of Twente P.O.Box 217, 7500 AE, The Netherlands, vol. 2986/2004,401-415.*
Garcia et al., "Using a Generic Document Recognition Method for Mathematical Formulae Recognition," In *Selected Papers From the Fourth International Workshop on Graphics Recognition Algorithms and Applications* pp. 236-244, 2002.
Rigamonti et al., "Towards a Canonical and Structured Representation of PDF Documents Through Reverse Engineering," In proc. of 8$^{th}$ International conference on Document Analysis and Recognition, Seoul (Korea), pp. 1050-1054, 2005.
Avis et al., "An Efficient Algorithm for Decomposing a Polygon into Star-Shaped Polygons," *Pattern Recognition*, vol. 13, No. 6, pp. 395-398, 1981.

* cited by examiner

*Primary Examiner*—Javid A Amini
(74) *Attorney, Agent, or Firm*—Fay Sharpe LLP

(57) ABSTRACT

In order to convert graphical content to a canonical format, the graphical content is separated into linear and filled polygonal planes. Linear features in the linear plane are decomposed into line segments having a canonical line segments ordering. Polygonal features in the polygonal plane are decomposed into trigons having a canonical trigons ordering.

23 Claims, 7 Drawing Sheets

| INITIAL
$s_i = <p_1, p_2, c, w>$
$s_j = <p_3, p_4, c', w'>$
p=INTERSECT POINT | CANONICAL | ADJUSTMENT(S) |
|---|---|---|
| CROSSING (AND $s_i < s_j$) | | $p$ BEING THE INTERSECTION POINT, $s_i = (p_1, p, c, w)$, INSERT A NEW $s_{k+1} = (p, p_2, c, w)$ $s_j = (p_3, p, c, w')$, INSERT A NEW $s_{k+2} = (p, p_4, c', w')$ |
| | | $s_j = (p_1, p_4, c, w)$, INSERT A NEW $s_{k+1} = (p_4, p_2, c, w)$ |
| | | $s_i = (p_1, p_3, c, w)$, INSERT A NEW $s_{k+1} = (p_3, p_2, c, w)$ |
| | | $s_i = (p_1, p_3, c, w')$, INSERT A NEW $s_{k+1} = (p_3, p_2, c, w)$ |
| | | $s_j = (p_3, p_2, c', w')$, INSERT A NEW $s_k = (p_2, p_4, c', w')$ |

FIG. 4

NORMALIZATION OF VECTOR-BASED GRAPHICAL REPRESENTATIONS

BACKGROUND

The following relates to the graphical information processing arts. It is described with example reference to processing and utilization of page description language (PDL) graphical content. However, the following is amenable to processing and utilization of graphical content in other formats, and to other like applications.

Documents commonly include textual content and graphical content. In portable document format (PDF), PostScript, scalable vector graphics (SVG), or other existing document representation formats, textual content is typically represented by a suitable character-based code along with optional text attributes such as font type, font size, and so forth, while graphical content is typically represented by a vector-based language in which objects are specified by coordinates and optional attributes. For example, a line segment object may be represented by starting and ending coordinates and color and line width attributes, while a filled square object may be represented by coordinates of two opposite corners and a color attribute.

Document analysis is typically performed with respect to textual content of documents. For example, portions of text duplicated in multiple documents is readily detectable and can be used to identify and correlate related documents. Text can also be structured based on content, for example by converting the text to structured XML in which the abstract, headings, paragraphs, and so forth are resolved into structures. These and other types of document analysis are useful for creating searchable knowledge bases for organizing and locating documents of interest.

Document analysis with respect to graphical content is not as well developed. Graphical document analysis is difficult because visually similar or identical graphical content can typically be represented in a multiplicity of different ways. For example, a line segment of length L can be constructed using a single line segment, or using two abutting parallel line segments of lengths L/3 and 2L/3, respectively, or by using two overlapping parallel line segments of length 2L/3 each with an overlap of L/3, or so forth. Similarly, a filled square graphic can be represented as a single filled square object, or as two adjacent filled triangular objects, or as four adjacent smaller filled square objects, or as two overlapping filled square objects, or so forth.

Because of the multiplicity of possible representations for visually similar or identical graphical content, identifying similar graphical content, identifying graphical objects of interest in graphical content, or performing other types of graphical document analysis is challenging.

One approach for facilitating graphical document analysis is to raster-process the vector-based graphical content to form a dot-matrix representation. However, this approach has substantial disadvantages. The underlying groupings of graphical objects (such as into filled polygons, line segments, or so forth) is lost, making analysis difficult in a dot-matrix representation. Dot-matrix representation of graphical content is also inefficient. For example, in a vector-based representation, a two-dimensional line segment is suitably represented by four numeric values indicating x- and y-coordinates of the endpoints and perhaps an additional one, two, or few numeric values to represent the line color, line width, or so forth. When converted to a dot-matrix representation, this same line segment occupies a two-dimensional portion of the dot-matrix, with each point represented by intensity and color values. The data needed to represent the line in the dot-matrix thus increases substantially overthe vector-based representation. Still further, conversion of graphical content to a dot-matrix representation is usually lossy, as the graphical content is converted to the resolution of the dot-matrix.

BRIEF DESCRIPTION

According to certain aspects illustrated herein, a method is disclosed for producing canonical graphical content. Graphical content is separated into linear and filled polygonal planes. Linear features in the linear plane are decomposed into line segments. The line segments are ordered using a canonical line segments ordering. Polygonal features in the polygonal plane are decomposed into trigons. The trigons are ordered using a canonical trigons ordering.

According to certain aspects illustrated herein, a storage medium is disclosed that stores instructions which when executed by a digital processor perform graphical content processing including at least converting selected graphical content into canonical graphic content by: separating the selected graphical content into linear and filled polygonal planes; decomposing the linear plane into non-overlapping line segments having a canonical line segments ordering; and decomposing the polygonal plane into non-overlapping trigons having a canonical trigons ordering.

According to certain aspects illustrated herein, a method is disclosed for converting line graphic content into a canonical format. Linear features of the line graphic content are decomposed into visually equivalent non-overlapping line segments. The non-overlapping line segments are ordered in accordance with a canonical line segments ordering defined with respect at least to coordinates of starting and ending points of the line segments.

BRIEF DESCRIPTION OF THE DRAWINGS

FIG. 4 diagrammatically shows suitable adjustments for removing line segment crossings.

DETAILED DESCRIPTION

Figure 1:
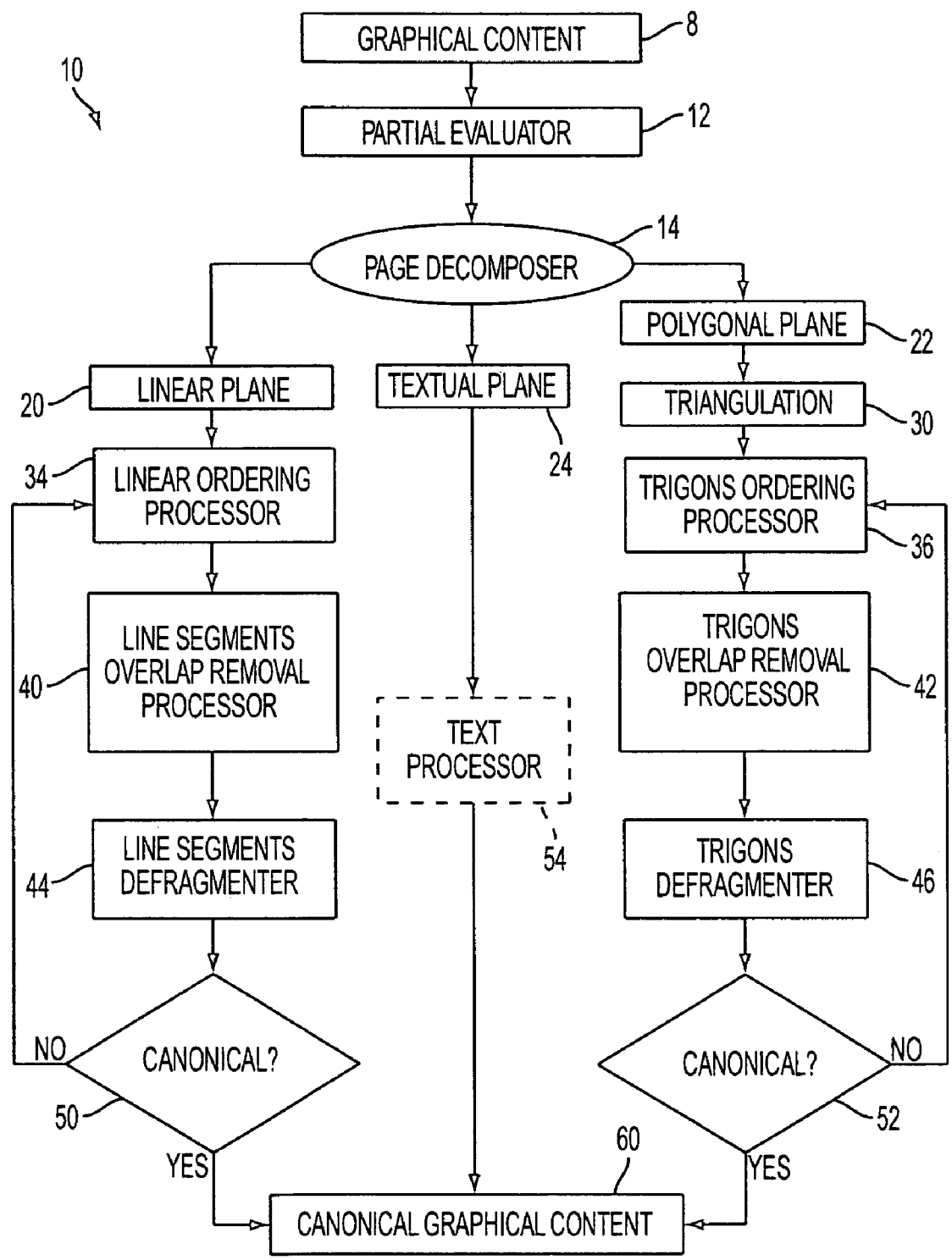
FIG. 1 diagrammatically shows a canonical transformation processor for converting graphical content into a canonical format.

To facilitate setting forth the example embodiments, an example page description language (PDL) employing a vector-based graphical language is described and employed herein. The skilled artisan can readily adapt the example embodiments disclosed herein to other formats such as portable document format (PDF), PostScript, scalable vector graphics (SVG), or so forth which employ vector-based graphical representations. The example PDL includes planes with continuous X and Y coordinates, an abstract color model using three continuous red, green, and blue planes, graphical objects such as text, lines, polylines, filled rectangles, filled polygons, and so forth, clipping areas, coordinate transformations, and so forth. Except where otherwise specified, the example PDL is considered to be independent of rendering features such as pixel resolution and color model. The example PDL employs a stack-based architecture; however, other architectures can be used. The example PDL includes typical graphical attributes such as clipping zones, transparency factor, fill and stroke colors, interpolation mechanisms, and various typical graphical objects such as filled and unfilled polygons, rectangles, and polylines. The graphical attributes are specified through a context stack, on which an object drawing instruction finds corresponding styling information. The formal syntax of the example vector-based graphical language of the example PDL is specified by the following context-free grammar:

G::=I G|I
I::=new-ctx|set attribute value|pop-ctx|push value
I::=text|line|line-to|move-to|rectangle|polygon value|polylines value The set instruction allows modifying the current graphical context, using attributes and values defined in Table 1.

TABLE 1

| Attribute | Value | range | default |
|---|---|---|---|
| fill-color, stroke color | R, G, B (real) | [0 ... 1] | 1, 1, 1 (white) |
| opacity | Real | [0 ... 1] | 1 (no transparency) |
| fill, stroke | Integer | 0 or 1 | 1 |
| width | Real | >0 | 1 |
| clipping | Sequence of points defining the clipping polygon $[p_1, \ldots, p_i]$ | i > 3 | [(0, 0), (1000, 0), (1000, 1000), (0, 10000, (0, 0)] |
| translation | Vector defining the translation of origin | — | (0, 0) |
| rotation | Angle of rotation to be applied to the origin vectors (real) | — | 0 |
| scale | Scaling factor to be applied to the origin vectors (real) | >0 | 1 |
| font-name | Name of the font | — | courier |
| font-size | Size of the font (integer) | — | 10 |
| font-style | 0: normal, 1: italic, 2: bold | — | 0 |

The semantics is defined through a rewriting system on sentences of the language plus three additional data structures, a current pointer P, a stack of values V, and a stack of graphical context C. The notation S°s symbolizes a stack with element s on its top and S being the rest of the stack, which may be empty or non-empty. An interpretation suitably starts with a default initial context where the current pointer P is set to (0,0), the Value stack is empty, and the context stack defaults to the values defined in Table 1. Operation of the instructions of the example PDL are set forth in Table 2.

TABLE 2

| instruction | parameter limits | Effect on data structure | Visual rendering on page |
|---|---|---|---|
| new-ctx | | P, V, C ° c → P, V, C ° c ° c | nothing |
| pop-ctx | | P, V, C ° c → P, V, C | nothing |
| set a v | a is not clipping | P, V, C ° c → P, V, C ° c' where c' gets a attribute set to value v | nothing |
| set clipping n | n > 2 | P, V ° $p_1$ ° ... ° $p_n$, C ° c → P, V, C ° c where c' gets clipping attribute set to the polygon built from $p_i$ and context c | nothing |
| push v | | P, V, C → P, V ° v, C | nothing |
| line | | P, V ° $p_1$ ° $p_2$, C ° c → $p_2$, V, C ° c | A segment $p_1$ $p_2$ is drawn according to graphical context c |
| text | | P, V ° s ° p, C ° c → p, V, C ° c | The text string s is drawn at top-left corner position p according to graphical context c |
| rectangle | | P, V ° $p_1$ ° $p_2$, C ° c → $p_2$, V, C ° c | A rectangle with top left corner $p_1$ and bottom right corner $p_2$ is drawn according to graphical context c |
| line-to | | $p_1$, V ° $p_2$, C ° c → $p_2$, V, C ° c | A segment $p_1$ $p_2$ is drawn according to graphical context c |
| move-to | | $p_1$, V ° $p_2$, C → $p_2$, V, C | nothing |
| Polylines n | n > 1 | P, V ° $p_1$ ° ... ° $p_n$, C ° c → $p_n$, V, C ° c | Draw n-1 lines according to graphical context c |

TABLE 2-continued

| instruction | parameter limits | Effect on data structure | Visual rendering on page |
|---|---|---|---|
| polygon n | n > 2 | P, V ° $p_1$ ... ° $p_n$, C ° c → $p_n$, V, C ° c | Draw polygon with vertices $p_1$ ... $p_n$ according to graphical context c |

The following graphical model is employed in the example PDL used to set forth the example embodiments. A discrete graphical plane is defined with X-Y orthogonal axes, X being vertical and oriented from top to bottom, and Y being horizontal and oriented from left to right. Coordinates are mathematically expressed using relative integers. A color model is used in which each object is assigned a given color specified, for example, by an RGB triple. In some embodiments, the graphical content may be grayscale, in which case each object is assigned a given color specified, for example, by a value indicative of a grayscale level. In some embodiments, the graphical content may be two-tone, such as black-and-white, in which case objects are suitably not assigned color values.

To facilitate conversion of graphical content into a unique canonical representation, a lexicographic ordering of points in the plane is defined. Substantially any lexicographic ordering can be defined or selected as long as it is used consistently. In the examples herein, the following example lexicographic ordering of points is selected: a point $p_1$ is less than a point $p_2$ if (i) the x-coordinate of $p_1$ is strictly smaller than the x-coordinate of $p_2$ or (ii) the points $p_1$ and $p_2$ have the same x-coordinate and the y-coordinate of $p_1$ is strictly smaller than the y-coordinate of $p_2$. Mathematically, this can be written as:

$$p_1 \prec p_2 \Leftrightarrow (p_1.x \prec p_2.x) \vee (p_1.x = p_2.x \wedge p_1.y \prec p_2.y) \quad (1).$$

Using the lexicographic ordering of Equation (1), points are ordered primarily based on the x-coordinate, and secondarily based on the y-coordinate. This order can be shown to be total, irreflexive, asymmetric and transitive.

A line segment is defined in the example lexicographic ordering by an oriented pair of points including: the starting point; the ending point; an optional color c; and an optional line width w. A well-formed line segment s is thus given by $s = \langle p_1, p_2, c, w \rangle$ where $p_1 \prec p_2$. Line segments are ordered in the example lexicographic ordering as:

$$\langle p_1,p_2,c,w \rangle \prec \langle p_3,p_4,c',w' \rangle \Leftrightarrow (p_1 \prec p_3) \vee (p_1 = p_3 \wedge (p_2 \prec p_4 \vee (p_2 = p_4 \wedge (c \prec c' \vee (c = c' \wedge (w < w')))))) \quad (2).$$

Using the lexicographic ordering of Equation (2), the line segments are ordered respective to coordinates of the starting and ending points, and are secondarily ordered respective to the line segment color and/or width.

A trigon is defined by an ordered triple of non-collinear points plus an optional color. A well-formed trigon t is given by $t = \langle p_1, p_2, p_3, c \rangle$ where $p_1 \prec p_2 \prec p_3$. Trigons are ordered in the example lexicographic ordering as:

$$\langle p_1,p_2,p_3,c \rangle \prec \langle p_4,p_5,p_6,c' \rangle \Leftrightarrow (p_1 \prec p_4) \vee (p_1 = p_4 \wedge (p_2 \prec p_5 \vee (p_2 = p_5 \wedge (p_3 \prec p_6 \vee (c \prec c'))))) \quad (3).$$

Using the lexicographic ordering of Equation (3), the trigons are ordered respective to coordinates of the three non-collinear points, and are secondarily ordered respective to the trigon color.

The lexicographic ordering set forth in Equations (1)-(3) and related text is an example. Other lexicographic orderings can be used. For example, the ordering of points can be by y-coordinate first, then by x-coordinate if the y-coordinates of two points are equal. The lexicographic ordering that is selected should be used consistently so as to produce a unique canonical graphical representation.

The approaches disclosed herein transform graphical content into a canonical representation. The canonical form is a vector-based representation of the graphical content produced by a defined canonical transformation algorithm. The canonical form is unique for given visual graphical content regardless of the vector representation of the graphical content input to the defined canonical transformation algorithm. As a result, two visually identical images constructed in different ways (that is, having different vector-based representations) have the same canonical vector representation after processing by the canonical transformation algorithm.

For example, a line segment of length L may be represented in a vector format using a single line segment, or using two abutting parallel line segments of lengths L/3 and 2L/3, respectively, or using two overlapping parallel line segments of length 2L/3 each with an overlap of L/3, or so forth. The visual appearance of these different representations is the same, namely a line segment of length L. Accordingly, the canonical transformation algorithm produces the same canonical vector representation for all such visually equivalent but different input vector representations. Similarly, a filled square object can be represented as a single filled square object, or as two adjacent filled triangular objects, or as four adjacent smaller filled square objects, or as two overlapping filled square objects, or so forth. The visual appearance of these different representations is the same, namely a filled square object of particular dimensions. Accordingly, the canonical transformation algorithm produces the same canonical vector representation for all such visually equivalent but different input vector representations.

The canonical representation advantageously is not a dot-matrix representation, but rather retains a tractable vector-based abstraction level. The canonical representation is suitably made up of objects such as line segments and filled trigons. The canonical representation does not inherently degrade resolution, although optionally the canonical transformation algorithm can incorporate a selected resolution or spatial granularity which can produce more compact or efficient canonical representations at the cost of being at the selected resolution or granularity. The canonical representation retains abstract objects that facilitate comparison of graphical content in different documents, identification of graphical objects of interest within a graphical page, and so forth.

Based on the examples disclosed herein, the skilled artisan can readily construct various canonical transformation algorithms. The canonical representation of input graphical content produced by a particular canonical transformation algorithm is unique for that algorithm; however, a different canonical transformation algorithm may produce for that same input graphical content a different canonical representation that is unique for that different canonical transformation algorithm. Accordingly, to facilitate document analysis such as comparisons between the graphical content of different documents, a particular canonical transformation algorithm is suitably selected and used consistently in the document analysis processing.

With reference to FIG. 1, graphical content 8 is processed by a canonical transformation processor 10 to convert the graphical content into a unique vector-based canonical form. The canonical transformation processor 10 receives as input graphical content 8 including a graphical description g generated in the grammar G, as well as optional pixel geometry information (such as W and H values indicating the width and height of a pixel, respectively), and an optional color space definition (such as specified by a discrete resolution of each color plane; it will be appreciated that if the graphical content is two-tone such as black-and-white, then the color space definition is suitably omitted, and similarly if the graphical content is grayscale the optional color space definition suitably specifies grayscale levels of objects). A partial evaluator 12 optionally performs selected initial operations. For example, the partial evaluator may define a viewport, clip portions of line segments, polygons, or other graphics to fit within the viewport, and so forth. In some embodiments, the partial evaluator 12 re-constructs or re-arranges overlapping objects to ensure order independence.

Figure 2A:
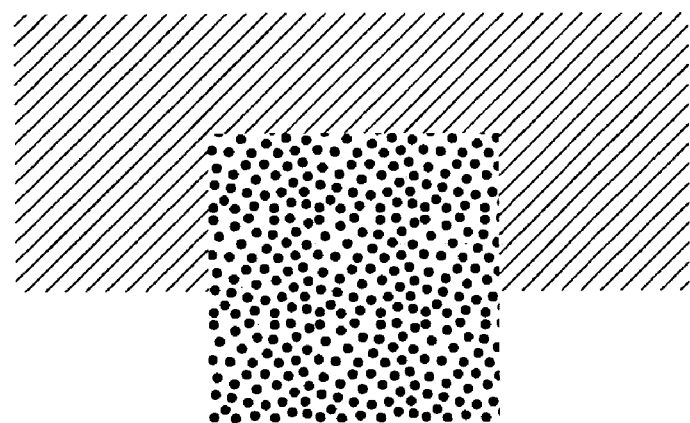
FIG. 2A diagrammatically shows a rendering of two overlapping rectangles.
Figure 2B:
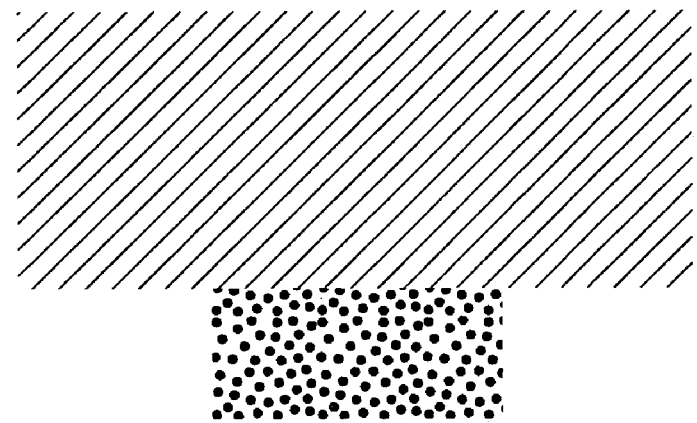
FIG. 2B diagrammatically shows another rendering of the two overlapping rectangles of FIG. 2A, but rendered in reverse order.
Figure 2C:
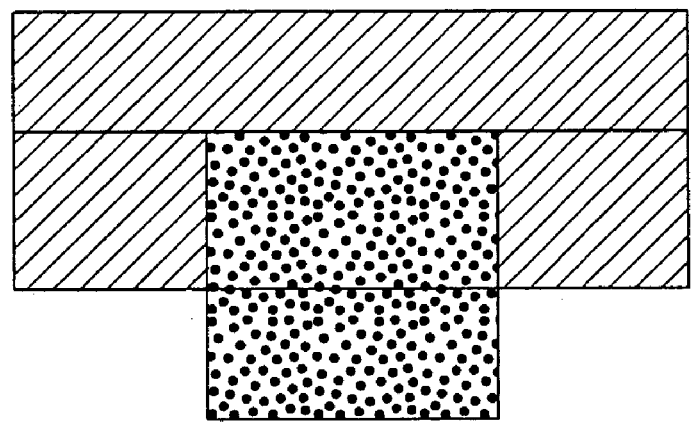
FIG. 2C diagrammatically shows rendering of five non-overlapping rectangle components that produce the same visual appearance as in FIG. 2A, but in a rendering order-independent form.

With continuing reference to FIG. 1 and with further reference to FIGS. 2A, 2B, and 2C, an example of re-construction of overlapping objects by the partial evaluator 12 is described. Example FIG. 1A shows two overlapping rectangles in which a larger upper rectangle is rendered after and hence partially covers a smaller lower rectangle. FIG. 1B shows the same two overlapping rectangles, but rendered in the reverse order with the result that the smaller lower rectangle partially covers the larger upper rectangle. Thus, the larger upper rectangle and smaller lower rectangle are not rendering order-independent.

On the other hand, FIG. 1C shows the rectangles of FIG. 1A re-constructed into five component rectangles whose rendering is order independent. (Note that in FIG. 1C, border lines of the five component rectangles are shown to illustrate the decomposition—it will be appreciated that these border lines are not part of the five component rectangles and, without the border lines, the rendering of FIG. 1C is visually indistinguishable from the rendering of FIG. 1A). Because none of the five component rectangles of the representation of FIG. 1C overlap, the order in which they are rendered is irrelevant.

In FIGS. 1A and 1C, the larger upper rectangle is entirely opaque. In some embodiments the covering filled object may be partially transparent such that the region of overlap has a modified color or grayscale intensity due to the underlying object partially showing through. It will be appreciated that the re-construction of FIG. 1C readily accommodates partial transparency since the central rectangle of the five component rectangles can have a different color and/or intensity corresponding to the color or grayscale intensity modification produced by the underlying object.

With returning reference to FIG. 1, a page decomposer 14 decomposes the graphical content 8 (after optional processing by the partial evaluator 12) into a linear plane 20 containing representations of line segments and object border lines, a polygonal plane 22 containing representations of filled graphical objects without border lines, and a textual plane 24 containing representations of textual content. These three planes 20, 22, 24 are further processed by the canonical transformation processor 10 to together provide a canonical graphical description which is visually equivalent to the original graphical content 8. Each plane encapsulates its stylistic features into attributes. In the case of the polygonal plane 22, polygons are suitably decomposed into trigons by a triangulation processor 30. Any three- or more-sided polygon (such as a triangle, rectangle, parallelogram, five-point star, regular or irregular pentagon, or so forth) is readily decomposed using a suitable triangulation algorithm into a set of one or more triangles or trigons covering the same area as the polygon. The line segments in the linear plane 20 are ordered in accordance with Equation (2) or another selected lexicographic ordering by a linear ordering processor 34. Similarly, the trigons in the polygonal plane 24 are ordered in accordance with Equation (3) or another selected lexicographic ordering by a trigons ordering processor 36.

Figure 3:
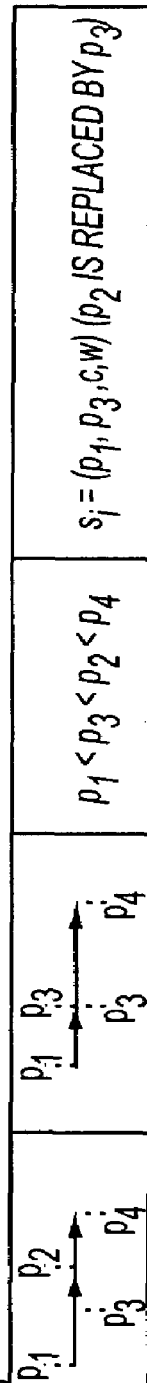
FIG. 3 diagrammatically shows suitable adjustments for removing line segment overlaps.

With continuing reference to FIG. 1 and with further reference to FIGS. 3 and 4, a line segments overlap removal processor 40 processes the ordered line segments of the linear plane 20 to remove redundant overlaps or crossings of line segments. In the case of overlapping segments, FIG. 3 illustrates suitable adjustments that are applicable when two parallel line segments designated $s_i = <p_1, p_2, c, w>$ and $s_j = <p_3, p_4, c, w>$, respectively, of substantially the same color and substantially common width are partially overlapping or wholly overlapping (that is, where one line is contained by another line). For example, if the ordering of the line segment points is such that $p_1 \triangleleft p_3 \triangleleft p_2 \triangleleft p_4$, then a suitable adjustment is to shorten line segment $s_i$ by replacing its end point $p_2$ with point $p_3$ thus eliminating the overlap. If the ordering of the line segment points is such that $p_1 \cong p_3 \triangleleft p_2 \triangleleft p_4$, then a suitable adjustment is to shorten line segment $s_j$ by replacing its starting point $p_3$ with point $p_2$ thus eliminating the overlap. If the ordering of the line segment points is such that $p_1 \triangleleft p_3 \triangleleft p_4 \triangleleft p_2$ (line segment $s_j$ contained by line segment $s_i$), then a suitable adjustment is to shorten line segment $s_i$ by replacing its end point $p_2$ with point $p_3$ to uncover line segment $s_j$ and to add a third line segment $<p_4, p_2, c, w>$ to span the portion of original line segment $s_i$ not covered by either the shortened line segment $s_i$ or line segment $s_j$. If the ordering of the line segment points is such that $p_1 \cong p_3 \triangleleft p_4 \triangleleft p_2$ (line segment $s_j$ contained by line segment $s_i$), then a suitable adjustment is to replace the two line segments $s_i$ and $s_j$ by non-overlapping line segments $<p_1, p_4, c, w>$ and $<p_4, p_2, c, w>$. If the ordering of the line segment points is such that $p_1 \triangleleft p_3 \triangleleft p_4 \triangleleft p_2$ (line segment $s_j$ contained by line segment $s_i$), then a suitable adjustment is to shorten line segment $s_i$ by replacing its end point $p_2$ with point $p_3$ thus uncovering line segment $s_j$. With reference to FIG. 4, similar adjustments are made to remove crossings of non-parallel line segments. The line segment crossing is removed by replacing the crossed line segment or line segments by equivalent line segments having starting or end points at the crossing point. Still further, the line segments overlap removal processor 40 suitably removes thinner line segments that are overlapped by thicker line segments. For example, given two line segments $<p_1, p_2, c, w>$ and $<p_1, p_2, c, w'>$ where $w > w'$, the line segment $<p_1, p_2, c, w'>$ is suitably removed.

FIG. 3 shows suitable adjustments for horizontal overlapping line segments and FIG. 4 for crossing horizontal and vertical lines. However, the adjustments of FIGS. 3 and 4 are readily employed for non-horizontal overlapping lines and for non-horizontal and/or non-vertical crossing line segments, and for non-orthogonal line segment crossings.

Figure 5:
FIG. 5 diagrammatically shows suitable adjustments for removing trigon coverings, overlaps, and crossings.

With continuing reference to FIG. 1 and with further reference to FIG. 5, a trigons overlap removal processor 42 processes the ordered trigons of the polygonal plane 22 to remove covered, crossing, or overlapping trigons of substantially the same color. In the case where a trigon $t_j$ is completely covered by a trigon $t_i$ of substantially the same color (which implies $t_i < t_j$ using the lexicographic ordering of Equation (3)), the covered trigon $t_j$ is suitably removed. In the case of crossing or partial overlap two trigons $t_i$, $t_j$ of the same color where $t_i < t_j$ and in which neither trigon is completely covered by the other, FIG. 5 illustrates suitable adjustments in which the trigon $t_j$ is replaced two or three replacement trigons such that the original trigon $t_i$ and the two or three replacement trigons are non-overlapping and span the same area as the original two trigons $t_i$, $t_j$.

Figure 6:
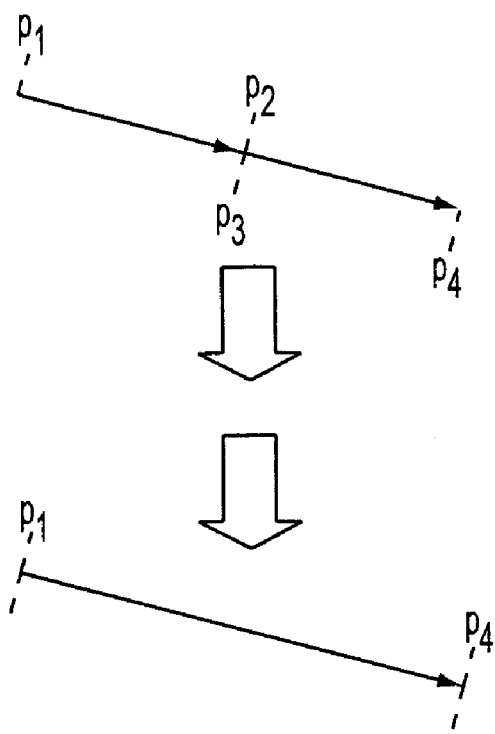
FIG. 6 diagrammatically shows a line segment defragmentation.

With continuing reference to FIG. 1 and with further reference to FIG. 6, a line segments defragmenter 44 combines parallel adjacent segments of substantially the same color and substantially common width to remove redundant fragmented line segments. As shown in FIG. 6, two line segments $<p_1,p_2,c,w>$ and $<p_3,p_4,c,w>$ are parallel and have substantially the same color and substantially common width. Moreover, the ending point $p_2$ of the first line segment is substantially the same as the starting point $p_3$ of the second line segment (that is, $p_2 \cong p_3$), and the joining point (that is, $p_2 \cong p_3$) is not the location of a crossing or termination of a third line segment. The combination of the two parallel line segments $<p_1,p_2,c,w>$ and $<p_3,p_4,c,w>$ is therefore not unique, since the joining point (that is, $p_2 \cong p_3$) could be located anywhere between $p_1$ and $p_4$. Accordingly, to ensure a unique canonical graphical representation the two parallel adjacent segments are suitably replaced by a single unique line segment $<p_1,p_4,c,w>$ that spans the same length as the original two fragmented line segments.

Figure 7:
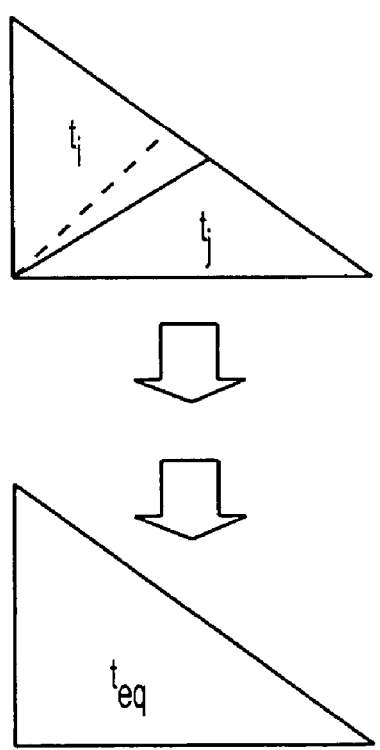
FIG. 7 diagrammatically shows a trigons defragmentation.

With continuing reference to FIG. 1 and with further reference to FIG. 7, a trigons defragmenter 46 combines adjacent trigons of substantially the same color to remove redundant trigons. As shown in FIG. 7, two trigons $t_i$, $t_j$ share a common side and are of substantially the same color. The two trigons $t_i$, $t_j$ are not unique, since the common side could be moved (for example, the dashed line in FIG. 7 represents another possible common side). Accordingly, the two adjacent trigons are suitably replaced by a single unique canonical equivalent trigon $t_{eq}$ spanning the same area as the original two trigons $t_i$, $t_j$.

With continuing reference to FIG. 1, a decision operation 50 determines whether the linear plane 20 after processing by the linear ordering processor 34, line segments overlap removal processor 40, and line segments defragmenter 44 is now in canonical form. If it is not, then the linear ordering processor 34, line segments overlap removal processor 40, and line segments defragmenter 44 are iteratively applied until the canonical form of the linear plane 20 is achieved. Similarly, a decision operation 52 determines whether the polygonal plane 22 after processing by the trigons ordering processor 36, trigons overlap removal processor 42, and trigons defragmenter 46 is now in canonical form. If it is not, then the trigons ordering processor 36, trigons overlap removal processor 42, and trigons defragmenter 46 are iteratively applied until the canonical form of the polygonal plane 22 is achieved. Once the linear and polygonal planes 20, 22 are in canonical form, they are combined with the textual plane 24 (optionally after selected processing for example by a text processor 54) to form canonical graphical content 60. The resulting canonical representation 60 of the graphical content 8 can be rendered by drawing the polygonal plane 22, the linear plane 20, and the textual plane 24 in that respective order, and such rendering is visually equivalent to rendering the original graphical content 8.

Adjustment of overlapping or covered lines using adjustments illustrated in FIG. 3, or de-fragmenting of joining lines as shown in FIG. 6, is applied when the lines have substantially common width. In some embodiments, this corresponds to exactly the same width, so that two line segments $<p_1,p_2,c,w>$ and $<p_3,p_4,c,w'>$ have substantially common width if $w=w'$. In other embodiments, substantially common width is defined respective to the resolution of the anticipated graphical rendering, or is defined respective to a selected granularity of pixel resolution. For example, if the difference between w and w' is less than a pixel size of an anticipated rendering (such as the resolution of a printer or display device to be used for the rendering), or is less than a selected granularity, then line segments of widths w and w' are considered to have substantially common width. In some embodiments such as line drawings using a uniform line width, the width attribute of line segments may be omitted, and all line segments are considered to have the same width, that is, all line segments are considered to have substantially common width.

Similarly, the line segment adjustments and joinings of FIGS. 3, 4, and 6 and the trigon adjustments and joinings of FIGS. 5 and 7 are performed for line segments and trigons of substantially the same color. In some embodiments, this corresponds to exactly the same color as set forth for example by an RGB triplet. In other embodiments, substantially the same color is defined respective to a color resolution or granularity. For example, if the color difference between two colors c and c' is less than a selected color granularity (as measured, for example, by a difference in CIE color coordinates or by another suitable color difference measure), then the colors c and c' are considered to be substantially the same color.

In the case of grayscale graphical content, the term "color" corresponds to a grayscale intensity, and c and c' can be considered to be substantially the same color if (in some embodiments) grayscale c=grayscale c', or if (in other embodiments) a difference between grayscale c and grayscale c' is less than a selected grayscale granularity. On the other hand, if the graphical content is two-tone (such as black-and-white with no shades of gray in-between) then the color attribute is optionally omitted and all trigons and line segments have the same color.

In some grayscale and color embodiments, the term "color" as applied to a line segment may also incorporate a line-type attribute. For example, two line segments may have the same RGB triplet or the same grayscale intensity, but may nonetheless be considered to be of different colors because the two line segments have different line-types, such as one being a solid line segment and the other being a dotted line segment or a dashed line segment. Similarly, in some grayscale and color embodiments, the term "color" as applied to filled a polygon (such as a trigon) may also incorporate a fill pattern. For example, two trigons may have the same RGB triplet or the same grayscale intensity, but may nonetheless be considered to be of different colors because the two trigons have different fill patterns, such as one being filled with cross-hatching and the other being filled with dots.

While example embodiments of the canonical transformation processor 10 are described herein respective to the example PDL graphical language set forth with reference to Tables 1 and 2, the skilled artisan can readily adapt the described example embodiments of the canonical transformation processor 10 or their equivalents for use with commercial or non-commercial vector-based graphical languages such as portable document format (PDF), PostScript, scalable vector graphics (SVG), or so forth. Similarly while example embodiments of the canonical transformation processor 10 are described herein respective to the example lexicographic ordering set forth with reference to Equations (1)-(3), the skilled artisan can readily employ other lexicographic orderings used consistently by the canonical transformation processor so that the canonical transformation processor produces a canonical output.

The illustrated canonical transformation processor 10 is configured to process both line graphics in the linear plane 20 and filled objects in the polygonal plane 22. In some embodiments, the graphical content 8 may be known a priori to be limited to line graphic content such as line art, linear table delineators, or so forth. In such embodiments, the components of the canonical transformation processor 10 that process filled objects (such as the triangulation processor 30, trigons ordering processor 36, trigons overlap removal processor 42, trigons defragmenter 46, and canonical decision processor 52) are optionally omitted.

Figure 8:
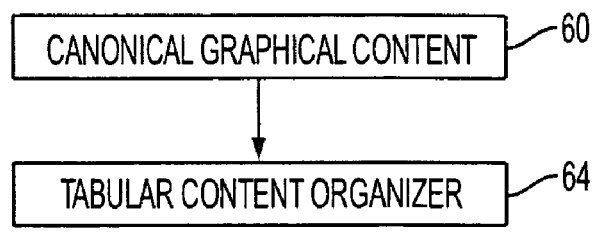
FIG. 8 diagrammatically shows an approach for organizing tabulated content using canonical graphical content produced by the canonical transformation processor of FIG. 1 to identify delineations of table rows and/or columns.
Figure 9:
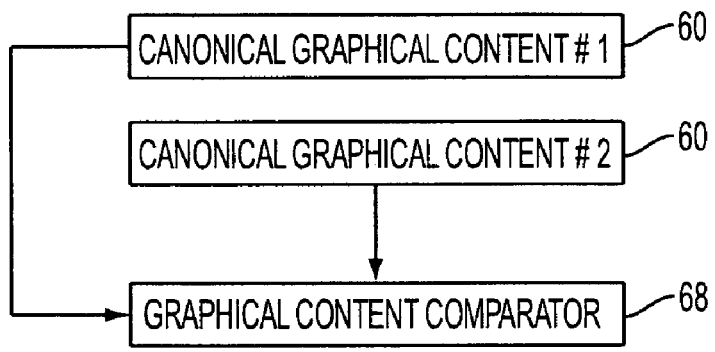
FIG. 9 diagrammatically shows an approach for comparing different graphical content using the canonical graphical format produced by the canonical transformation processor of FIG. 1.
Figure 10:
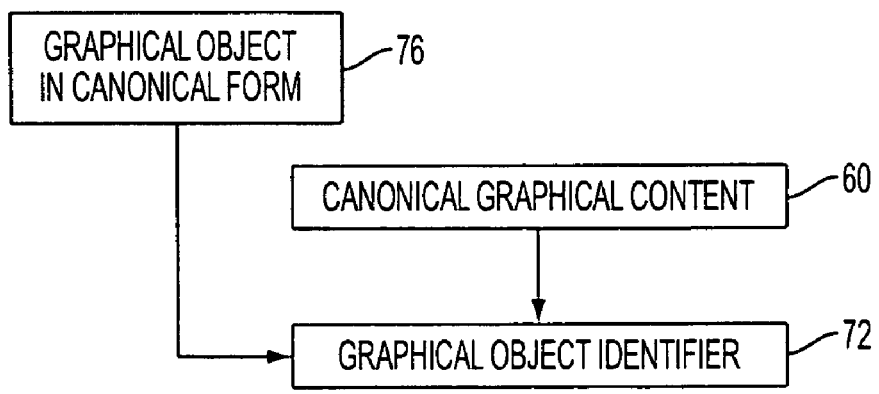
FIG. 10 diagrammatically shows an approach for identifying a graphical object in graphical content using the canonical graphical format produced by the canonical transformation processor of FIG. 1.

With reference to FIGS. 8, 9, and 10, some example applications of the canonical representation 60 of the graphical content 8 are described. In FIG. 8, the canonical graphical content 60 is used by a tabular content organizer 64 to organize tabular content of a document. The canonical graphical content 60 identifies graphical row and/or column separators that delineate table rows and/or columns, respectively, enabling ready identification of table elements, straightforward determination of the number of rows and/or columns of each table, and so forth.

With reference to FIG. 9, canonical graphical content 60 and different canonical graphical content 60' both produced by the same canonical transformation processor 10 are compared by a graphical content comparator 68 to determine similarities and/or differences between the two different contents 60, 60', which may for example be two different pages of graphical content, two different graphical figures, or so forth. Because the canonical representation removes redundancy present in non-canonical graphical content, the graphical content comparator 68 can readily make comparisons respective to substantive visual aspects of the graphical content.

With reference to FIG. 10, the canonical graphical content 60 is analyzed by a graphical object identifier 72 to identify whether the graphical content includes a graphical object of interest. For example, the graphical object identifier 72 may identify corporate logos, graphical trademarks, or other graphical objects of particular significance. The canonical graphical content 60 ensures that the logo of interest will have a unique canonical format in the canonical graphical content 60, which can be readily compared with the canonical form of the graphical object of interest 76 produced by applying the canonical transformation processor 10 to a known vector-based representation of the graphical object. In contrast, attempting to identify a logo or other graphical object in non-canonical graphical content is difficult since the logo could be contained in the non-canonical graphical content in many different visually redundant forms or representations.

The canonical transformation processor 10 and other optional graphical processing components 64, 68, 72 can be physically embodied in various ways. Typically, a storage medium stores instructions which when executed by a digital processor perform graphical content processing in accordance with the described operation of the canonical transformation processor 10 and described optional graphical processing components 64, 68, 72. The storage medium can be, for example, a magnetic disk, an optical disk, a read-only memory (ROM), a random-access memory (RAM), a storage medium of a network server, or so forth. The digital processor can be, for example, a digital computer, a digital calculator, a microprocessor, a microcontroller, network server, or so forth. In some embodiments, the storage medium and the digital processor may be integrated as a unit. For example, a desktop, laptop, or other computer may include a hard drive serving as the storage medium and a microprocessor and/or other digital circuitry serving as the digital processor. In other embodiments, the storage medium and digital processor may be distinctly separate. For example, the instructions may be stored on a remote storage medium connected with a network, and executed by a processor of a computer connected with the network. The instructions stored on the storage medium may access library functions or other instructions stored elsewhere to perform certain operations of the canonical transformation processor 10 and/or the graphical processing components 64, 68, 72. For example, the instructions stored on the storage medium which when executed by a digital processor perform the graphical content processing may include instructions accessing a remotely stored triangulation library function that performs the operations of the triangulation processor 30.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for producing canonical graphical content, the method comprising:
    separating graphical content into linear and filled polygonal planes;
    decomposing linear features in the linear plane into line segments;
    ordering the line segments using a canonical line segments ordering;
    decomposing polygonal features in the polygonal plane into trigons wherein each trigon is defined at least by three non-collinear points; and
    ordering the trigons using a canonical trigons ordering, the ordering of the trigons using a canonical trigons ordering comprising ordering the trigons respective to coordinates of the three non-collinear points;
    the canonical graphical content comprising at least the line segments ordered using the canonical line segments ordering and the trigons ordered using the canonical trigons ordering;
    the method for producing canonical graphical content being performed by a digital processor.

2. The method as set forth in claim 1, wherein:
    the line segments produced by the decomposing of linear features are non-overlapping for line segments of substantially common width and substantially the same color; and
    the trigons produced by the decomposing of polygonal features are non-overlapping for trigons of substantially the same color.

3. The method as set forth in claim 1, wherein the decomposing of linear features comprises:
    removing a first line segment that is entirely overlapped by a second parallel line segment of substantially similar color and substantially common or greater width.

4. The method as set forth in claim 1, wherein the decomposing of linear features comprises:
    replacing two parallel overlapping line segments of substantially similar color by two or more non-overlapping parallel line segments that span the same length as the two overlapping parallel line segments.

5. The method as set forth in claim 1, wherein the decomposing of linear features comprises:
replacing two crossing non-parallel line segments by three or more non-crossing non-parallel line segments.

6. The method as set forth in claim 1, wherein the decomposing of linear features comprises:
replacing two or more parallel overlapping line segments of substantially similar color and substantially common width with a single line segment that spans the same length as the two or more parallel overlapping line segments.

7. The method as set forth in claim 1, wherein the decomposing of polygonal features comprises:
removing a first trigon that is entirely covered by a second trigon of substantially similar color.

8. The method as set forth in claim 1, wherein the decomposing of polygonal features comprises:
replacing two partially overlapping trigons of substantially similar color by three or more non-overlapping trigons covering the same area as the two partially overlapping trigons.

9. The method as set forth in claim 1, wherein the decomposing of polygonal features further comprises:
replacing two trigons of substantially similar color having a common side with a single trigon covering the same area as the two trigons.

10. The method as set forth in claim 1, wherein each trigon is further defined by a color value, and the ordering of the trigons using a canonical trigons ordering further comprises:
secondarily ordering the trigons respective to the color value.

11. A method for producing canonical graphical content, the method comprising:
separating graphical content into linear and filled polygonal planes;
decomposing linear features in the linear plane into line segments;
ordering the line segments using a canonical line segments ordering, wherein each line segment is defined at least by starting and ending points, and the ordering the line segments using a canonical line segments ordering comprises ordering the line segments respective to coordinates of the starting and ending points and further comprises at least one of:
secondarily ordering the line segments respective to color value wherein each line segment is further defined by a color value, and
secondarily ordering the line segments respective to the width value wherein each line segment is further defined by a width value;
decomposing polygonal features in the polygonal plane into trigons; and
ordering the trigons using a canonical trigons ordering;
the canonical graphical content comprising at least the line segments ordered using the canonical line segments ordering and the trigons ordered using the canonical trigons ordering;
the method for producing canonical graphical content being performed by a digital processor.

12. The method as set forth in claim 11, wherein each line segment is further defined by a width value and the ordering the line segments using a canonical line segments ordering further comprises at least secondarily ordering the line segments respective to the width value.

13. The method as set forth in claim 11, wherein each line segment is further defined by a color value and the ordering the line segments using a canonical line segments ordering further comprises at least secondarily ordering the line segments respective to the color value.

14. The method as set forth in claim 11, further comprising:
determining delineations of at least one of table rows and table columns based on the canonical graphical content.

15. The method as set forth in claim 11, wherein the separating, decomposing linear features in the linear plane into line segments, ordering the line segments using a canonical line segments ordering, decomposing polygonal features in the polygonal plane into trigons, and ordering the trigons using a canonical trigons ordering are performed for first graphical content to produce corresponding first canonical graphical content and for second graphical content to produce second canonical graphical content, the method further comprising:
comparing the first canonical graphical content and the second canonical graphical content whereby the corresponding first graphical content and second graphical content are compared.

16. The method as set forth in claim 11, further comprising:
identifying one or more graphical objects in the canonical graphic content.

17. A computer-readable storage medium storing instructions which when executed by a digital processor perform a method comprising:
separating graphical content into linear and filled polygonal planes;
decomposing linear features in the linear plane into line segments;
ordering the line segments using a canonical line segments ordering;
decomposing polygonal features in the polygonal plane into trigons wherein each trigon is defined at least by three non-collinear points; and
ordering the trigons using a canonical trigons ordering, the ordering comprising ordering the trigons respective to coordinates of the three non-collinear points;
wherein canonical graphical content comprising at least the line segments ordered using the canonical line segments ordering and the trigons ordered using the canonical trigons ordering is produced.

18. The storage medium as set forth in claim 17, wherein the method performed by the processor executing the stored instructions further comprises:
converting first graphical content into first canonical graphical content;
converting second graphical content into second canonical graphical content; and
performing at least one comparison between the first and second canonical graphical content.

19. The storage medium as set forth in claim 17, wherein the method performed by the processor executing the stored instructions further comprises:
determining delineations of at least one of table rows and table columns based on the canonical graphical content.

20. The storage medium as set forth in claim 17, wherein the method performed by the processor executing the stored instructions further comprises:
identifying one or more graphical objects in the canonical graphic content.

21. The storage medium as set forth in claim 17, wherein each trigon is further defined by a color value, and the ordering of the trigons using a canonical trigons ordering further comprises:
secondarily ordering the trigons respective to the color value.

22. The storage medium as set forth in claim 17, wherein:
the line segments produced by the decomposing of linear features are non-overlapping for line segments of substantially common width and substantially the same color; and
the trigons produced by the decomposing of polygonal features are non-overlapping for trigons of substantially the same color.

23. The storage medium as set forth in claim 17, wherein each line segment is defined at least by starting and ending points, and the ordering the line segments using a canonical line segments ordering comprises:
ordering the line segments respective to coordinates of the starting and ending points.

* * * * *